United States Patent
Geyer (10) Patent No.: US 8,813,479 B2
(45) Date of Patent: Aug. 26, 2014

(54) EMISSIONS CONTROL DIAGNOSTIC METHOD AND SYSTEM

(75) Inventor: Stephen Mark Geyer, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 664 days.

(21) Appl. No.: 13/103,505

(22) Filed: May 9, 2011

(65) Prior Publication Data

US 2012/0285139 A1 Nov. 15, 2012

(51) Int. Cl.
*F01N 3/00* (2006.01)

(52) U.S. Cl.
USPC .................................. 60/295; 60/274; 60/311

(58) Field of Classification Search
CPC ......... Y02T 10/47; Y02T 10/24; Y02T 10/40; F01N 3/10; F01N 3/035; F01N 3/023; F01N 9/00; F01N 9/002
USPC .................................. 60/274, 286, 295, 311
See application file for complete search history.

(56) References Cited

U.S. PATENT DOCUMENTS

| | | | |
|---|---|---|---|
| 7,543,446 B2 | 6/2009 | Ruth et al. | |
| 7,841,172 B2 | 11/2010 | Scaife et al. | |
| 2005/0284139 A1 | 12/2005 | Verkiel et al. | |
| 2008/0022655 A1 | 1/2008 | Forthmann et al. | |
| 2008/0295484 A1 | 12/2008 | Scaife et al. | |
| 2010/0005784 A1* | 1/2010 | Bird et al. | 60/284 |
| 2010/0089040 A1* | 4/2010 | Handa | 60/287 |
| 2011/0146233 A1* | 6/2011 | Carlill et al. | 60/274 |
| 2011/0185708 A1* | 8/2011 | McCarthy et al. | 60/286 |
| 2012/0060477 A1* | 3/2012 | Alm et al. | 60/274 |
| 2012/0084018 A1* | 4/2012 | Nevin et al. | 702/34 |
| 2012/0125271 A1* | 5/2012 | Bada Ghar Wala | 123/41.04 |
| 2012/0180463 A1* | 7/2012 | Oohashi et al. | 60/297 |
| 2013/0040802 A1* | 2/2013 | Lee et al. | 502/6 |
| 2013/0152550 A1* | 6/2013 | Karlsson et al. | 60/274 |

FOREIGN PATENT DOCUMENTS

| | | | | |
|---|---|---|---|---|
| EP | 2143903 A1 | | 1/2010 | |
| EP | 2143919 A1 | * | 1/2010 | ............. F02D 41/02 |
| JP | 2004144072 A | * | 5/2004 | ............... F01N 3/20 |
| JP | 2011052561 A | * | 3/2011 | |
| WO | WO 2008068226 A1 | * | 6/2008 | |
| WO | WO 2012030278 | * | 3/2012 | |

OTHER PUBLICATIONS

Machine Translation of WO 2008/068226, Machine Translated on Jan. 10, 2013.*
Model-Based Fault Diagnosis of a NOx Aftertreatment System. P. Pisu, M. Canova, A. Soliman. Proceedings of the 17th World Congress; The International Federation of Automatic Control (IFAC). Seoul, Korea, Jul. 6-11, 2008.
Exhaust Aftertreatment; Advanced Emission Controls. Cummins.

* cited by examiner

*Primary Examiner* — Thomas Denion
*Assistant Examiner* — Patrick Maines
(74) *Attorney, Agent, or Firm* — GE Global Patent Operation; John A. Kramer (57) ABSTRACT

Various methods for and embodiments of an aftertreatment system which includes a catalyst disposed upstream of a particulate filter are provided. In one example, the method includes, conducting soot regeneration of the particulate filter under a selected operating condition, and determining whether a soot regeneration frequency of the particulate filter is greater than a threshold frequency. The method further includes initiating a sulfur regeneration of the aftertreatment system based on the soot regeneration frequency of the particulate filter being greater than the threshold frequency, determining whether the soot regeneration frequency of the particulate filter is less than the threshold frequency after the sulfur regeneration, and conducting non-regeneration operation of the aftertreatment system based on the soot regeneration frequency of the particulate filter being less than the threshold frequency after the sulfur regeneration of the aftertreatment system.

19 Claims, 6 Drawing Sheets

EMISSIONS CONTROL DIAGNOSTIC METHOD AND SYSTEM

FIELD

Embodiments of the subject matter disclosed herein relate to diagnosing an aftertreatment system disposed in an exhaust passage of an internal combustion engine.

BACKGROUND

An emissions control system, or aftertreatment system, may be included in an exhaust system of an engine in order to reduce regulated emissions. In one example, the aftertreatment system may include an oxidation catalyst and a particulate filter. The oxidation catalyst may convert nitric oxide (NO) to nitrogen dioxide ($NO_2$) which oxidizes particulate matter (e.g., soot) in the particulate filter, thereby facilitating passive regeneration of the particulate filter. Over time, the aftertreatment system may become contaminated by various chemical compounds such as fuel additives, lube oil additives, sulfur from the lube oil, sulfur from the fuel, and the like, decreasing the efficiency of the aftertreatment system. As such, conversion of NO to $NO_2$ in the oxidation catalyst may be reduced resulting in a lower frequency of passive regeneration and an increased frequency of active regeneration. Further, during active regeneration, fuel may be injected and burned in the exhaust passage upstream of the particulate filter in order to drive the temperature of the particulate filter up to a temperature where the particulate matter will burn. As such, fuel consumption is increased, thereby decreasing fuel economy.

BRIEF DESCRIPTION

In one embodiment, a method for an aftertreatment system, which includes a catalyst disposed upstream of a particulate filter, includes conducting soot regeneration of the particulate filter under a selected operating condition, and determining whether a soot regeneration frequency of the particulate filter is greater than a threshold frequency. The method further includes initiating a sulfur regeneration of the aftertreatment system based on the soot regeneration frequency of the particulate filter being greater than the threshold frequency, and determining whether the soot regeneration frequency of the particulate filter is less than the threshold frequency after the sulfur regeneration. Further, the method includes conducting non-regeneration operation of the aftertreatment system based on the soot regeneration frequency of the particulate filter being less than the threshold frequency after the sulfur regeneration of the aftertreatment system When soot regeneration of the particulate filter occurs at a frequency greater than a threshold frequency, it may be an indication that conversion of nitric oxide (NO) to nitrogen dioxide ($NO_2$) in the catalyst has decreased. For example, less $NO_2$ is available to consume soot in the particulate filter leading to an increase in soot build-up in the particulate filter and a need for regeneration to be carried out more frequently to clean the soot from the particulate filter. By initiating a sulfur regeneration of the aftertreatment system when the soot regeneration frequency is greater than the threshold frequency, sulfur from lube oil, fuel, and the like may be cleaned from the particulate filter and the conversion of NO to $NO_2$ may be increased. If the frequency of soot regeneration of the particulate filter does not decrease after the sulfur regeneration, however, degradation of the catalyst may be indicated. In this way, efficiency of the aftertreatment system and/or fuel economy may be increased.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of an aftertreatment system and methods for diagnosing the aftertreatment system disposed in an exhaust passage of an engine. In one example embodiment, a method for an aftertreatment system, which includes a catalyst disposed upstream of a particulate filter, includes initiating a sulfur regeneration of the aftertreatment system when a soot regeneration frequency of the particulate filter is greater than a threshold frequency. The method further includes, after the sulfur regeneration of the aftertreatment system, indicating degradation of the catalyst if the soot regeneration frequency of the particulate filter does not decrease below the threshold frequency. In this manner, the aftertreatment system may operate with a greater efficiency when the catalyst is not degraded. Further, the catalyst may be replaced, for example, when degradation is indicated such that inefficient operation does not continue for an extended duration.

Figure 1:
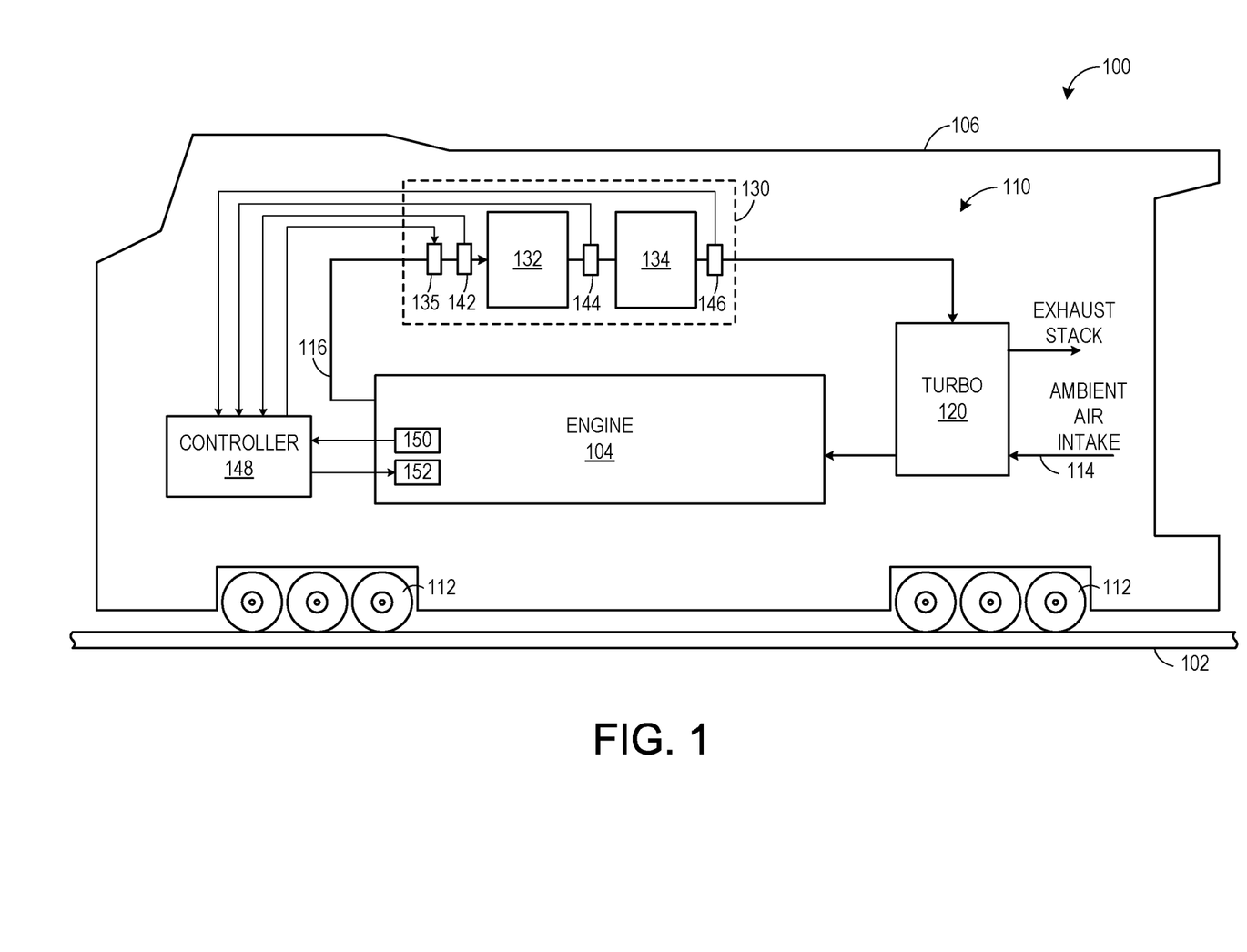
FIG. 1 shows a schematic diagram of an example embodiment of a rail vehicle with an aftertreatment system according to an embodiment of the invention.

In some embodiments, the aftertreatment system may be configured for an engine in a vehicle, such as a rail vehicle. For example, FIG. 1 shows a block diagram of a non-limiting embodiment of a vehicle system 100 (e.g., a locomotive system), herein depicted as a rail vehicle 106, configured to run on a rail 102 via a plurality of wheels 112. As depicted, the rail vehicle 106 includes an engine system 110 with an engine 104, such as an internal combustion engine. In other non-limiting embodiments, engine 104 may be a stationary engine, such as in a power-plant application, or an engine in a marine vessel, mining equipment, or off-highway or on-road vehicle propulsion system.

The engine 104 receives intake air for combustion from an intake conduit 114. The intake conduit 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

The rail vehicle 106 further includes a controller 148 as part of a control system to control various components related to the vehicle system 100, and operable to implement a method for diagnosing an aftertreatment system as described in any of the embodiments herein. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, etc. Correspondingly, the controller 148 may control the vehicle system 100 by sending commands to various components such as traction motors, alternator, cylinder valves, throttle, etc.

As depicted in FIG. 1, the engine system 110 includes a turbocharger 120 that is arranged between the intake conduit 114 and the exhaust passage 116. The turbocharger 120 increases air charge of ambient air drawn into the intake conduit 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

The engine system 110 further includes an aftertreatment system 130 coupled in the exhaust passage 116 upstream of the turbocharger 120. By positioning the aftertreatment system upstream of the turbocharger, passive regeneration of the turbocharger may be facilitated, for example, as exhaust gas may have a higher temperature upstream of the turbocharger than downstream of the turbocharger due to expansion of the gasses through the turbocharger. In other embodiments, however, the aftertreatment system may be disposed downstream of the turbocharger in the exhaust passage 116. As will be described in greater detail below, the aftertreatment system 130 may include one or more components.

In one example embodiment, the aftertreatment system 130 may include an oxidation catalyst, such as a diesel oxidation catalyst (DOC) 132 and a particulate filter, such as a diesel particulate filter (DPF) 134, where the DOC 132 is positioned upstream of the DPF 134 in the aftertreatment system 130. In some examples, the DOC 132 may be a catalyzed DOC to facilitate the conversion of NO to $NO_2$, so that soot may be consumed (e.g., oxidized) by $NO_2$ in the DPF. As an example, the DOC may be coated with platinum or palladium. Likewise, the DPF may be catalyzed. In other examples, the DPF may not be catalyzed. In alternate embodiments, the aftertreatment system 130 may additionally or alternatively include a selective catalytic reduction (SCR) catalyst, three-way catalyst, $NO_x$ trap, various other emission control devices or combinations thereof.

As depicted in FIG. 1, the aftertreatment system further includes a fuel injector 136 disposed in the exhaust passage upstream of the DOC 132. The fuel injector may deliver fuel to the exhaust passage in order to increase a temperature of the exhaust gas passing through the aftertreatment system 130, thereby increasing a temperature of at least one component of the aftertreatment system 130 so that active regeneration may occur. As a non-limiting example, the fuel injector 136 may be a solenoid-actuated pintle valve which receives fuel from a fuel tank (fuel tank), such as the fuel tank which provides fuel to the engine for combustion, in proportion to the pulse width of a signal received from the controller 148. For example, a larger pulse width may deliver more fuel to the exhaust passage than a shorter pulse width. In other examples, the fuel injector may be another suitable injector for delivering fuel to the exhaust passage.

In one embodiment, the control system including the controller 148 may be communicatively coupled to an external heat source that is operable to actively regenerate the DPF during operation of the heat source. For example, the external heat source may be a heater that is operated to increase the temperature of the DPF alone or in combination with fuel injection in the exhaust passage.

In another embodiment, the controller 148 of the vehicle system 100 may be additionally or alternatively configured to selectively increase a $NO_2$ content of engine exhaust gas to oxidize diesel particulate matter at a temperature in a range that is less than 500° C., or to introduce a fuel-borne catalyst to a fuel supply to provide microscopic metal particles to the diesel particulate matter, and thereby to trigger oxidation at a temperature in a range that is less than 500° C. As one example, exhaust gas recirculation may be reduced such that $NO_x$ formation may be increased. In this manner, a greater amount of $NO_2$ may be available for particulate matter oxidation. As another example, a fuel-borne catalyst, such as platinum and/or cerium or iron, may be added to one or both of the fuel that is injected to the cylinders of the engine and the fuel that is injected to the exhaust passage upstream of the DOC. The fuel borne catalyst may facilitate conversion of NO to $NO_2$, for example, such that an increased amount of $NO_2$ is available for particulate matter oxidation.

Further, the aftertreatment system 130 includes a plurality of sensors 142, 144, and 146. As depicted, a sensor 142 is disposed upstream of the DOC 132, a sensor 144 is disposed between the DOC 132 and the DPF 134, and a sensor 146 is disposed downstream of the DPF 134. The sensors 142, 144, and 146 may be temperature sensors and/or pressure sensors, for example, which provide feedback to the controller 148. In one example, the sensor 142 may be a temperature sensor which provides temperature data to the controller 148. In one example, the controller 148 may send a signal to the fuel injector 136 to inject fuel to the exhaust passage so that active regeneration may occur when the sensor 142 indicates the exhaust gas temperature is too is such that active regeneration may occur. For example, passive regeneration may occur at a temperature in a range from about 250° C. to about 500° C. Active regeneration may occur at a temperature that is in a range that is greater than about 550° C., and more specifically, in a range from about 550° C. to about 600° C. Sulfur regeneration may occur at a temperature that is in a range that is greater than about 600° C., and more specifically, in a range from about 600° C. to about 650° C. Further, the sensors 144 and 146 may be pressure sensors which monitor a pressure difference across the DPF 134 to indicate when an active regeneration of the DPF is needed (e.g., when a pressure drop exceeds a threshold value). In other embodiments, any another suitable combination of sensors may be provided in the aftertreatment system.

Thus, the engine system may include an aftertreatment system with an oxidation catalyst and a particulate filter. The oxidation catalyst may be catalyzed such that NO in the exhaust stream is converted to $NO_2$, which oxidizes soot in the particulate filter.

In one embodiment, a vehicle system comprises an engine cab defined by a roof assembly and side walls, an engine positioned in the engine cab such that a longitudinal axis of the engine is aligned in parallel with a length of the engine cab. The vehicle system further comprises an aftertreatment system mounted on the engine within a space defined by a top surface of an exhaust manifold of the engine, the roof assembly, and the side walls of the engine cab such that a longitudinal axis of the aftertreatment system is aligned in parallel with the longitudinal axis of the engine, the aftertreatment system including an oxidation catalyst disposed upstream of a particulate filter. Further, the vehicle system comprises a controller configured to identify an active soot regeneration frequency of the oxidation catalyst, initiate a sulfur regeneration of the aftertreatment system based on the active soot regeneration frequency, identify the active soot regeneration frequency of the particulate filter after the sulfur regeneration, and indicate degradation of the oxidation catalyst based on the active soot regeneration frequency.

Figure 2:
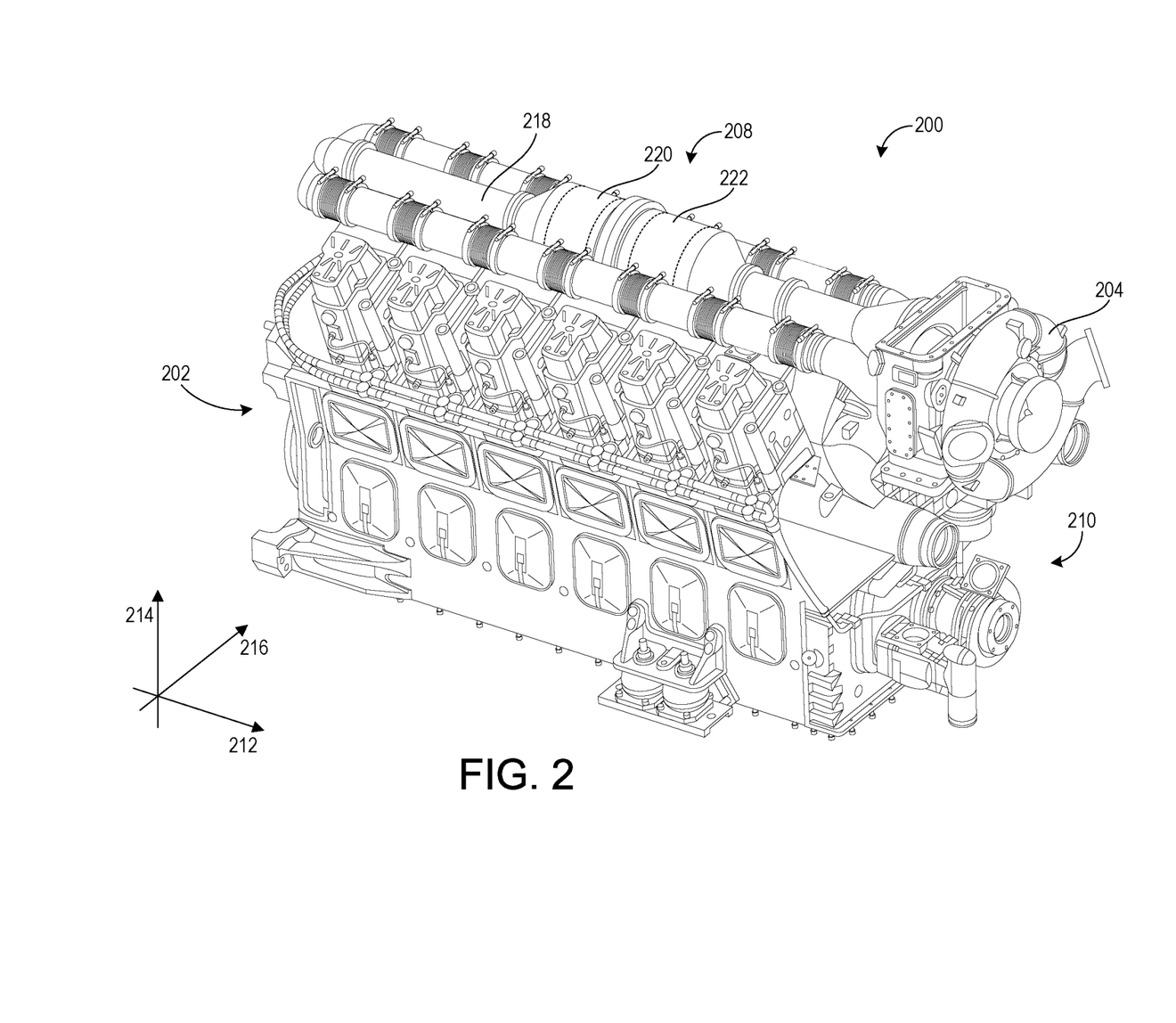
FIG. 2 shows a perspective view, approximately to scale, of an engine with a turbocharger and an aftertreatment system.

Turning to FIG. 2, an example engine system 200 is illustrated, the engine system 200 including an engine 202, such as the engine 104 described above with reference to FIG. 1. FIG. 2 is approximately to-scale. The engine system 200 further includes a turbocharger 204 mounted on a front side of the engine and an aftertreatment system 208 positioned on a top portion of the engine.

In the example of FIG. 2, engine 202 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIG. 2, and in FIG. 3, the longitudinal direction is indicated by 212, the vertical direction is indicated by 214, and the lateral direction is indicated by 216. Each bank of cylinders includes a plurality of cylinders. Each of the plurality of cylinders includes an intake valve which is controlled by a camshaft to allow a flow of compressed intake air to enter the cylinder for combustion. Each of the cylinders further includes an exhaust valve which is controlled by the camshaft to allow a flow of combusted gases (e.g., exhaust gas) to exit the cylinder.

In the example embodiment of FIG. 2, the exhaust gas exits the cylinder and enters an exhaust manifold positioned within the V (e.g., in an inboard orientation). In other embodiments, the exhaust manifold may be in an outboard orientation, for example, in which the exhaust manifold is positioned outside of the V. In the example of FIG. 2, the engine 202 is a V-12 engine. In other examples, the engine may be a V-6, V-16, I-4, I-6, I-8, opposed 4, or another engine type.

As mentioned above, the engine system 200 includes a turbocharger 204 positioned at a front end 210 of the engine 202. In the example of FIG. 2, the front end 210 of the engine is facing toward a right side of the page. Intake air flows through the turbocharger 204 where it is compressed by a compressor of the turbocharger before entering the cylinders of the engine 202. In some examples, the engine further includes a charge air cooler which cools the compressed intake air before it enters the cylinder of the engine 202. The turbocharger is coupled to the exhaust manifold of the engine 202 such that exhaust gas exits the cylinders of the engine 202 and then flows through an exhaust passage 218 and enters an aftertreatment system 208 before entering a turbine of the turbocharger 204. At locations upstream of the turbocharger, exhaust gas may have a higher temperature and a higher volume flow rate than at locations downstream of the turbocharger due to decompression of the exhaust gas upon passage through the turbocharger.

In other embodiments, the aftertreatment system 208 may be positioned downstream of the turbocharger 204. As an example, if the aftertreatment system is positioned in a rail vehicle that passes through tunnels, a temperature of the exhaust gas may increase upon passage through a tunnel. In such an example, exhaust gas may have a higher temperature after passing through the turbocharger and passive regeneration of the exhaust gas treatment may occur, as will be described in greater detail below.

Figure 3:
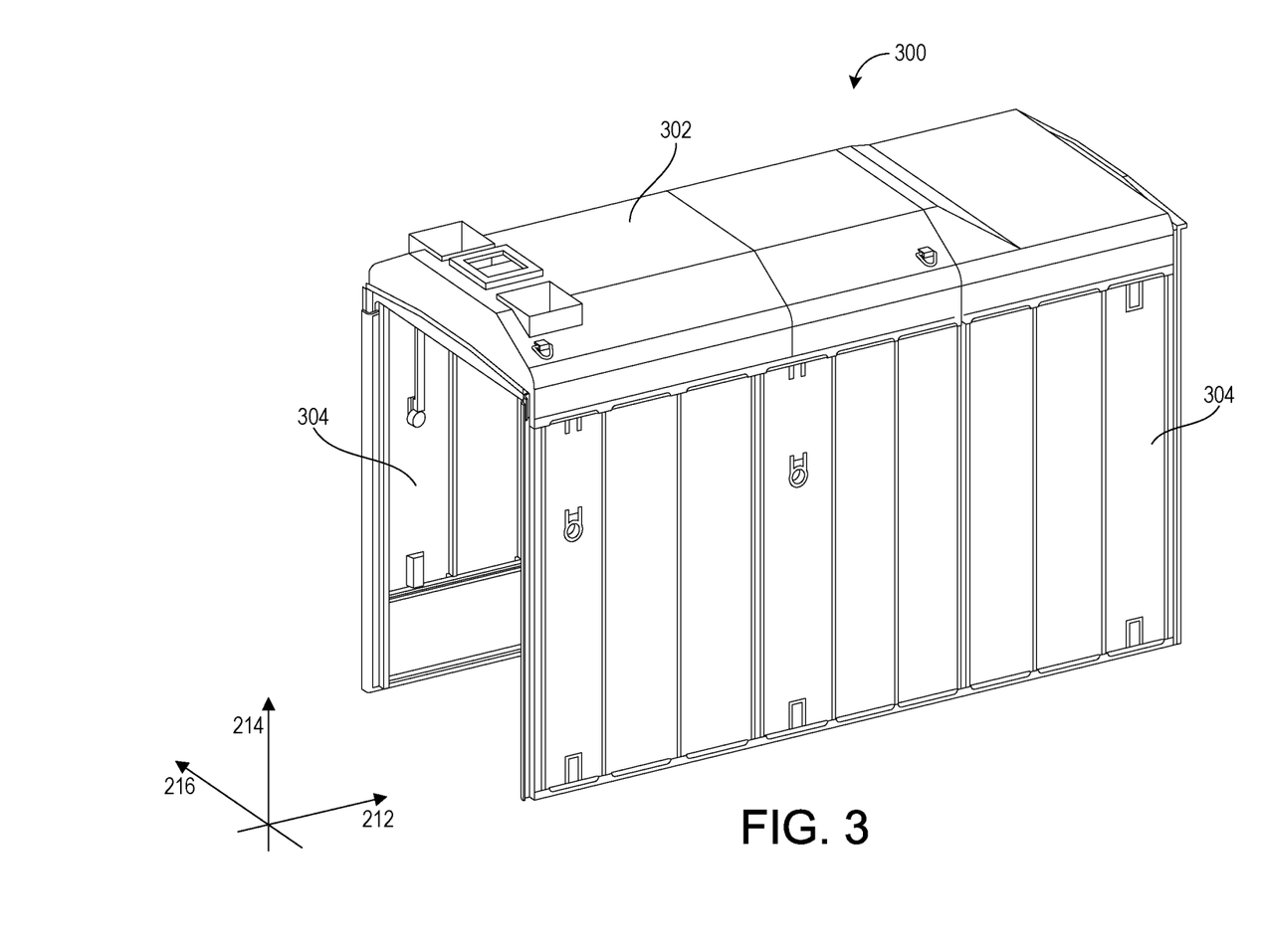
FIG. 3 shows a perspective view, approximately to scale, of an example embodiment of an engine cab.

In the example embodiment shown in FIG. 2, the aftertreatment system 208 is positioned vertically above the engine 202. The aftertreatment system 208 is positioned on top of the engine 202 such that it fits within a space defined by a top surface of an exhaust manifold of the engine 202, a roof assembly 302 of an engine cab 300, and the side walls 304 of the engine cab. The engine cab 300 is illustrated in FIG. 3. The engine 202 may be positioned in the engine cab 300 such that the longitudinal axis of the engine is aligned in parallel with a length of the cab 300. As depicted in FIG. 2, a longitudinal axis of the aftertreatment system is aligned in parallel with the longitudinal axis of the engine.

The aftertreatment system 208 is defined by the exhaust passage aligned in parallel with the longitudinal axis of the engine. In the example embodiment shown in FIG. 2, the aftertreatment system 208 includes an oxidation catalyst 220 and a particulate filter 222.

In other non-limiting embodiments, the engine system 200 may include more than one aftertreatment system, such as DOC, a DPF coupled downstream of the DOC, and a selective catalytic reduction (SCR) catalyst coupled downstream of the diesel particulate filter. In another example embodiment, the aftertreatment system may include an SCR system for reducing $NO_x$ species generated in the engine exhaust stream and a particulate matter (PM) reduction system for reducing an amount of particulate matter, or soot, generated in the engine exhaust stream. The various exhaust after-treatment components included in the SCR system may include an SCR catalyst, an ammonia slip catalyst (ASC), and a structure (or region) for mixing and hydrolyzing an appropriate reductant used with the SCR catalyst, for example. The structure or region may receive the reductant from a reductant storage tank and injection system, for example.

In another embodiment, the aftertreatment system 208 may include a plurality of distinct flow passages aligned in a common direction (e.g., along the longitudinal axis of the engine). In such an embodiment, each of the plurality of flow passages may include one or more aftertreatment systems which may each include an oxidation catalyst and a particulate filter.

By positioning the aftertreatment system on top of the engine such that the exhaust passage is aligned in parallel with the longitudinal axis of the engine, as described above, a compact configuration can be enabled. In this manner, the engine and aftertreatment system can be disposed in a space, such as an engine cab as described above, where the packaging space may be limited.

Further, by positioning the aftertreatment system upstream of the turbocharger, further compaction of the configuration may be enabled. For example, upstream of the turbocharger, exhaust gas emitted from the engine is still compressed and, as such, has a greater volume flow rate than exhaust gas that has passed through the turbocharger. As a result, a size of the aftertreatment system may be reduced.

Figure 4:
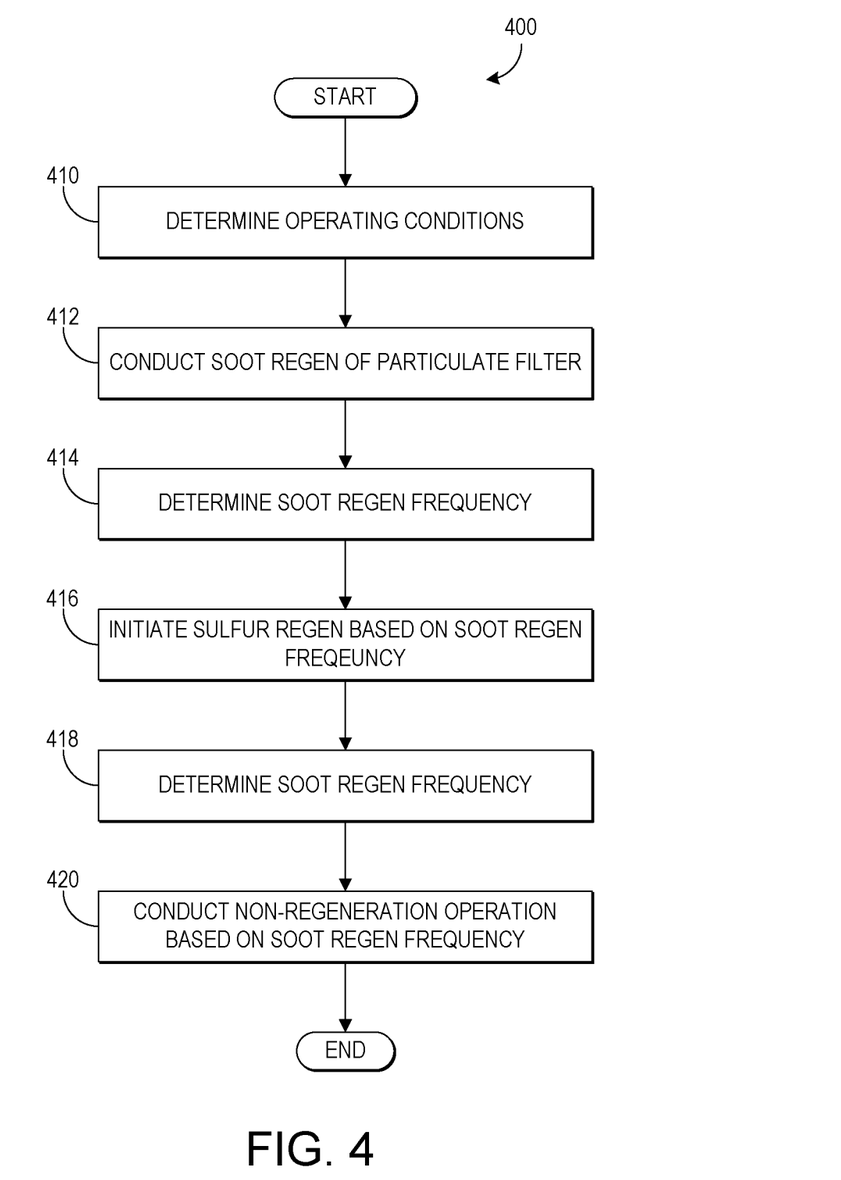
FIGS. 4 and 5 show flow charts illustrating diagnostic methods for an aftertreatment system.

Continuing to FIG. 4, a high level flow chart is shown which illustrates a diagnostic method 400 for an aftertreatment system including a catalyst disposed upstream of a particulate filter, such as the aftertreatment system 130 described above with reference to FIG. 1 or the aftertreatment system 208 described above with reference to FIG. 2. Specifically, the method 400 determines a frequency of active soot regeneration of the particulate filter and initiates a sulfur regeneration of the aftertreatment system or diagnoses degradation of the catalyst based on the active soot regeneration frequency.

At 410 of method 400, operating conditions are determined. Operating conditions may include engine load conditions, environmental conditions (e.g., if a rail vehicle in which the aftertreatment device is positioned is operating in a tunnel), exhaust gas conditions (e.g., temperature, pressures in the aftertreatment system), and the like.

Once the operating conditions are determined, at 412 of method 400, soot regeneration of the particulate filter is conducted. The soot regeneration of the particulate filter may be active regeneration which occurs at a temperature in a range from about 550° C. to about 600° C., for example. Further, the soot regeneration may be conducted based on a selected operating condition such as a pressure drop across the particulate filter greater than a threshold pressure, as will be described in greater detail below with reference to FIG. 5.

At 414, the soot regeneration frequency is determined. In one example, the soot regeneration frequency may be a number of regenerations that occurs over a predetermined duration. In another example, the frequency of active regeneration may be a duration between subsequent active regenerations of the aftertreatment system.

At 416 of method 400, sulfur regeneration of the aftertreatment system is initiated based on the soot regeneration frequency determined at 414. As one example, the sulfur regeneration may be initiated in response to a particulate filter regeneration frequency that is greater than a threshold frequency.

At 418 of method 400, the soot regeneration frequency is determined after the sulfur regeneration of the aftertreatment system has been carried out. At 420, non-regeneration operation is conducted based on the soot regeneration frequency determined at 418. As an example, non-regeneration operation may be carried out when it is determined that the particulate filter regeneration frequency is less than the threshold frequency after the sulfur regeneration is carried out, and an increase in exhaust gas temperature is not required to clean the aftertreatment system.

In one embodiment, a method for diagnosing an aftertreatment system positioned in an exhaust passage of an engine, the aftertreatment system including a catalyst disposed upstream of a particulate filter comprises, under a selected condition, increasing a temperature of the aftertreatment system to a particulate filter regeneration temperature to regenerate the particulate filter, and determining a frequency of regeneration of the particulate filter is greater than a threshold frequency. The method further comprises increasing the temperature of the aftertreatment system to a sulfur regeneration temperature, where the sulfur regeneration temperature is higher than the particulate filter regeneration temperature, to initiate sulfur regeneration of the aftertreatment system in response to the frequency of regeneration of the particulate filter greater than the threshold frequency. The method further comprises determining, after the sulfur regeneration, the frequency of regeneration of the particulate filter continues to be greater than the threshold frequency, determining a number of sulfur regenerations in response to the frequency of particulate filter regenerations is greater than a threshold number, and indicating degradation of the catalyst in response to the number of sulfur regenerations greater than threshold number.

Figure 5:
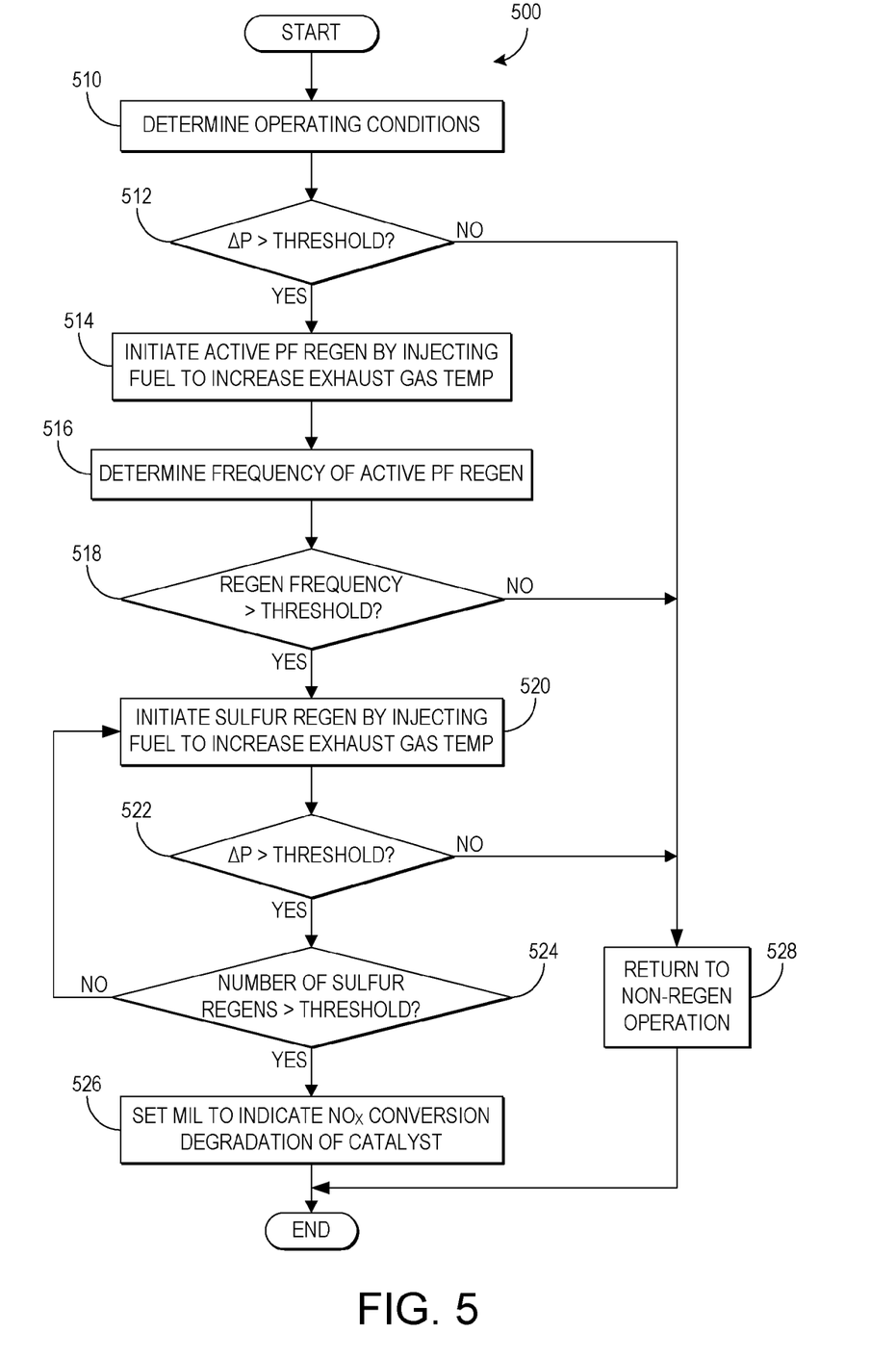

Turning to FIG. 5, a flow chart is shown which illustrates a diagnostic method 500 for an aftertreatment system including a catalyst disposed upstream of a particulate filter, such as the aftertreatment system 130 described above with reference to FIG. 1 or the aftertreatment system 208 described above with reference to FIG. 2. Specifically, the method 500 determines a frequency of active soot regeneration of the particulate filter and initiates a sulfur regeneration of the aftertreatment system or indicates degradation of the catalyst based on the active soot regeneration frequency.

At 510 of method 500, operating conditions are determined. Operating conditions may include engine load conditions, environmental conditions (e.g., if a rail vehicle in which the aftertreatment device is positioned is operating in a tunnel), exhaust gas conditions (e.g., temperature, pressures in the aftertreatment system), and the like, as described above.

Once the operating conditions are determined, method 500 continues to 512 where it is determined if the pressure drop (e.g., the difference between the pressures upstream of the particulate filter and downstream of the particulate filter, $\Delta P$) across the particulate filter is greater than a threshold pressure. As an example, an increased pressure drop across the particulate filter may indicate that there is an increased amount of soot in the particulate filter and exhaust gas flow through the filter is reduced. If it is determined that the pressure drop across the filter is less than the threshold pressure, method 500 moves to 528 where non-regeneration operation of the aftertreatment system is carried out.

On the other hand, if it is determined that the pressure drop across the particulate filter is greater than a threshold pressure, method 500 proceeds to 514 where active particulate filter regeneration is initiated by injecting fuel to the exhaust passage upstream of the catalyst in order to increase the exhaust gas temperature and at least one component of the aftertreatment system. For example, injecting fuel in the exhaust passage may generate an exotherm in the exhaust flow. The temperature of the exhaust gas may be increased to a temperature in a range from about 550° C. to about 600° C. for a duration of 20 to 30 minutes for active soot regeneration of the particulate filter, for example. In other examples, particulate filter regeneration may be initiated based on a soot model or a combination of the soot model and the measured pressure drop.

At 516 of method 500, a frequency of active regeneration is determined. In one example, the frequency of active regeneration may be a number of times active regeneration has occurred in a predetermined duration. In another example, the frequency of active regeneration may be a duration between subsequent active regenerations of the aftertreatment system. Further, in some embodiments, not every active regeneration that occurs may be counted in the active regeneration frequency. For example, an increase in active regeneration frequency that occurs during tunnel operation may not be counted. As another example, active regenerations that occur as a result of excessive idle and light-load engine operation may not be counted.

At 518 of method 500, it is determined if the active regeneration frequency of the particulate filter is greater than a threshold frequency. In one example, the threshold frequency may be a number of active regenerations that occurs over a predetermined duration during predetermined operating conditions (e.g., part-load engine operation). In another example, the threshold frequency may be based on an amount of fuel injected to the aftertreatment system for active regeneration during predetermined operating conditions for a predetermined duration.

Continuing with FIG. 5, if it is determined that the active regeneration frequency of the particulate filter is less than a threshold value, method 500 moves to 528 where the aftertreatment system returns to non-regeneration operation, as described above. On the other hand, if it is determined that the active regeneration frequency is greater than the threshold frequency, method 500 proceeds to 520 where sulfur regeneration is initiated. In some examples, sulfur regeneration may be initiated by injecting fuel to the aftertreatment system upstream of the catalyst to generate an exotherm in the exhaust flow. In other examples, a temperature of the exhaust flow may be modulated by adjusting a throttle valve of the engine. The temperature of the exhaust gas may be increased to a temperature in a range of from about 600° C. to about 650° C. for a duration of 15 minutes for active sulfur regeneration of the aftertreatment system, for example. By carrying out sulfur regeneration, sulfur accumulation in the catalyst from sulfur in the fuel, sulfur in the lube oil, or the like may be reduced. As such, a relative NO to $NO_2$ conversion rate of the catalyst may be restored unless other contamination, which may not be removed by regeneration, is present in the catalyst.

After sulfur regeneration has occurred, method 500 proceeds to 522 where it is determined if a pressure drop across the particulate filter is greater than a threshold pressure, as described above. In some examples, the threshold pressure may be the same threshold pressure as at 512 of method 500. In other examples, the threshold pressure at 522 may be less than or greater than the pressure at 512. A pressure drop that is less than the threshold pressure may indicate the sulfur regeneration did not sufficiently clean the catalyst such that the relative conversion rate of NO to $NO_2$ has been restored. In contrast, a pressure drop that is greater than the threshold pressure may indicate the sulfur regeneration did sufficiently clean the catalyst that conversion of NO to $NO_2$ has been restored. Thus, if it is determined that the difference in pressure across the particulate filter is less than the threshold pressure, method 500 moves to 528 and the aftertreatment system returns to non-regeneration operation.

Instead, if it is determined that the pressure drop is greater than the threshold pressure, method 500 continues to 524 where it is determined if the number of sulfur regenerations is greater than a threshold number. As a non-limiting example, the sulfur regeneration may be carried out two times in order to restore the $NO_x$ conversion efficiency of the catalyst. It should be understood, the sulfur regeneration may be carried out any suitable number of times based on the engine and/or vehicle in which the aftertreatment system is positioned. If the number of sulfur regenerations is less than the threshold number, method 500 returns to 520 where the sulfur regeneration is carried out again to clean the catalyst and increase the relative conversion rate of NO to $NO_2$ in the catalyst such that soot may be consumed by the $NO_2$ at the particulate filter.

On the other hand, if it is determined that the number of sulfur regenerations carried based on an increased frequency of particulate filter regenerations is greater than the threshold number, method 500 proceeds to 526 where a visual indicator system is employed to indicate degradation (e.g., reduced conversion of NO to $NO_2$) of the catalyst. In one example, a malfunction indicator lamp (MIL) is set to indicate degradation. In this manner, an operator of the vehicle in which the aftertreatment system is location may be informed such that catalyst may be replaced.

Figure 6:
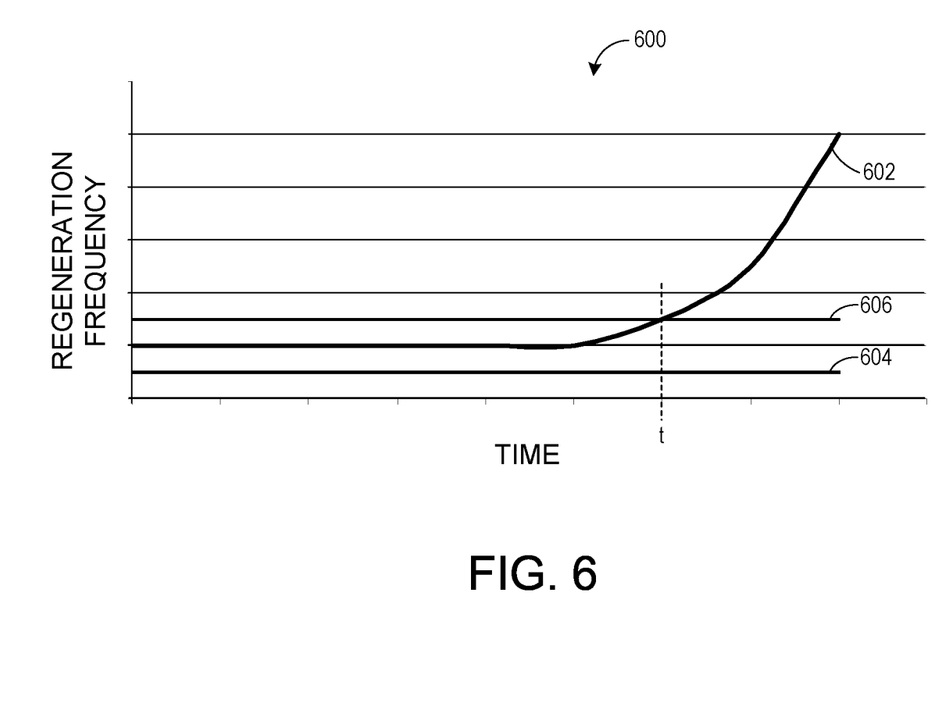
FIG. 6 shows a graph illustrating active regeneration frequency of an aftertreatment system over time.

FIG. 6 shows a graph 600 illustrating regeneration frequency over time. In the graph 600, the curve 602 represents the regeneration frequency, the line 604 represents a minimum regeneration frequency, and the line 606 represents a maximum regeneration frequency. As depicted, the regeneration frequency exceeds the maximum threshold frequency at a time t. Thus, a sulfur regeneration may be initiated at the time t or shortly thereafter. Further, as depicted, the regeneration frequency continues to increase above the maximum threshold frequency after the time t. As such, degradation of the catalyst may be indicated, as described above. In one example, the frequency may be calculated using the number of active regenerations over the time interval leading up to time t. In another example, the number of active regenerations over a fixed time interval may be compared to the threshold value. Further, a trend line may be developed with fixed time interval analysis. As such, the threshold may be a function of the method for determining the frequency value.

The maximum and minimum threshold frequencies may be dependent on the duty cycle and application of the vehicle in which the aftertreatment system is positioned. As one non-limiting example, the maximum threshold frequency may be two times per day. As another non-limiting example, the maximum threshold frequency may be eight times per week. The minimum threshold frequency may be a frequency set to monitor if passive regeneration is working. As a non-limiting example, the minimum threshold frequency may be one time per month. If the active regeneration frequency is lower than the minimum threshold frequency, it may be determined that passive regeneration is working. As another non-limiting embodiment, the minimum regeneration frequency may be a frequency set to reduce degradation of the aftertreatment system, for example, active regeneration may be carried out once a month or once every other month.

Thus, by monitoring the active soot regeneration frequency of the particulate filter in an aftertreatment system, and sensing a reduction in a relative conversion rate of NO to $NO_2$, degradation of the catalyst may be diagnosed. In this manner, an operating efficiency of the aftertreatment system, as well as fuel economy, may be increased. For example, a NO to $NO_2$ conversion efficiency of the catalyst may be increased or restored such that particulate matter conversion and/or hydrocarbon conversion at the particulate filter is increased or restored, thereby reducing the need for active soot regeneration frequency of the particulate resulting in less fuel injection to the aftertreatment system.

As used herein, the terms "from about" and "to about," when referring to a range of values defined by two endpoints, such as from about value "X" to about value "Y," means that the range includes the stated endpoints.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third,"

etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an aftertreatment system, the aftertreatment system including a catalyst disposed upstream of a particulate filter, comprising:
   conducting soot regeneration of the particulate filter under a selected operating condition;
   determining whether a soot regeneration frequency of the particulate filter is greater than a threshold frequency;
   initiating a sulfur regeneration of the aftertreatment system based on the soot regeneration frequency of the particulate filter being greater than the threshold frequency;
   determining whether the soot regeneration frequency of the particulate filter is less than the threshold frequency after the sulfur regeneration of the aftertreatment system;
   conducting non-regeneration operation of the aftertreatment system based on the soot regeneration frequency of the particulate filter being less than the threshold frequency after the sulfur regeneration of the aftertreatment system; and
   continuing sulfur regeneration of the aftertreatment system if the soot regeneration frequency of the particulate filter is greater than the threshold frequency after sulfur regeneration of the aftertreatment system and indicating degradation of the catalyst if a number of sulfur regenerations initiated responsive to the soot regeneration frequency is greater than a threshold number.

2. The method of claim 1, wherein indicating degradation of the catalyst includes employing a visual indicator system to alert a vehicle operator of catalyst degradation.

3. The method of claim 2, wherein indicating degradation of the catalyst comprises sensing a reduction in a relative conversion rate of nitric oxide to nitrogen dioxide.

4. The method of claim 1, further comprising conducting the soot regeneration of the particulate filter at a temperature in a range of from about 550° C. to about 600° C., and initiating the sulfur regeneration of the aftertreatment system by increasing a temperature of at least one component of the aftertreatment system to be in a range of from about 600° C. to about 650° C.

5. The method of claim 4, further comprising injecting fuel upstream of the catalyst to increase a temperature of at least one component of the aftertreatment system.

6. The method of claim 1, further comprising actively regenerating the particulate filter.

7. The method of claim 1, wherein the selected operating condition includes a pressure drop across the particulate filter greater than a threshold value.

8. A method carried out by a controller, the method for diagnosing an aftertreatment system positioned in an exhaust passage of an engine, the aftertreatment system including a catalyst disposed upstream of a particulate filter, the method comprising:
   under a selected condition, increasing a temperature of the aftertreatment system to a particulate filter regeneration temperature to regenerate the particulate filter;
   determining a frequency of regeneration of the particulate filter is greater than a threshold frequency;
   increasing a temperature of at least one component of the aftertreatment system to a sulfur regeneration temperature, where the sulfur regeneration temperature is higher than the particulate filter regeneration temperature, to initiate sulfur regeneration of the aftertreatment system in response to the frequency of regeneration of the particulate filter being greater than the threshold frequency;
   determining whether, after the sulfur regeneration, the frequency of regeneration of the particulate filter continues to be greater than the threshold frequency;
   determining whether a number of sulfur regenerations, the number of sulfur regenerations only being sulfur regenerations initiated in response to the frequency of particulate filter regenerations, is greater than a threshold number; and
   indicating degradation of the catalyst in response to the number of sulfur regenerations being greater than the threshold number.

9. The method of claim 8, wherein the selected condition includes a pressure difference across the particulate filter being greater than a threshold pressure difference.

10. The method of claim 8, wherein the particulate filter regeneration temperature is in a range that is greater than about 550° C.

11. The method of claim 8, wherein the controller is communicatively coupled to an external heat source that is operable to actively regenerate the particulate filter during operation of the heat source.

12. The method of claim 8, wherein the sulfur regeneration temperature is in a range that is greater than about 600° C.

13. The method of claim 8, wherein indicating degradation of the catalyst includes indicating degradation with a visual indictor system, the visual indicator system including a malfunction indicator lamp (MIL).

14. The method of claim 8, wherein the controller is communicatively coupled to a fuel injector coupled to the aftertreatment system for injecting fuel upstream of the catalyst.

15. A vehicle system comprising:
   an engine cab defined by a roof assembly and side walls;
   an engine positioned in the engine cab such that a longitudinal axis of the engine is aligned in parallel with a length of the engine cab;
   an aftertreatment system mounted on the engine within a space defined by a top surface of an exhaust manifold of the engine, the roof assembly, and the side walls of the engine cab such that a longitudinal axis of the aftertreatment system is aligned in parallel with the longitudinal axis of the engine, the aftertreatment system including an oxidation catalyst disposed upstream of a particulate filter; and
   a controller configured to identify an active soot regeneration frequency of the particulate filter, initiate a sulfur regeneration of the aftertreatment system based on the active soot regeneration frequency, identify a number of sulfur regenerations responsive to the active soot regeneration frequency of the particulate filter after initiation of the sulfur regeneration, and indicate degradation of the oxidation catalyst based on the number of sulfur regenerations.

16. The vehicle system of claim 15, wherein the sulfur regeneration is initiated if the active soot regeneration frequency is greater than a threshold frequency.

17. The vehicle system of claim 15, wherein degradation is indicated if the number of sulfur regenerations is greater than a threshold number.

18. The vehicle system of claim 15, wherein the active soot regeneration occurs when a temperature of the aftertreatment system is in a range of from about 550° C. to about 600° C., and the sulfur regeneration occurs when the temperature of the aftertreatment system is in a range of from about 600° C. to about 650° C.

19. The vehicle system of claim 15, wherein the controller selectively:
- increases a nitrogen dioxide content of engine exhaust gas to oxidize diesel particulate matter at a temperature in a range that is less than 500° C.; or
- introduces a fuel-borne catalyst to a fuel supply to provide microscopic metal particles to the diesel particulate matter, and thereby to trigger oxidation at a temperature in a range that is less than 500° C.

* * * * *